Oct. 20, 1959 B. B. SE BRENY 2,909,208
TUBELESS AIR WHEEL
Filed Feb. 13, 1956
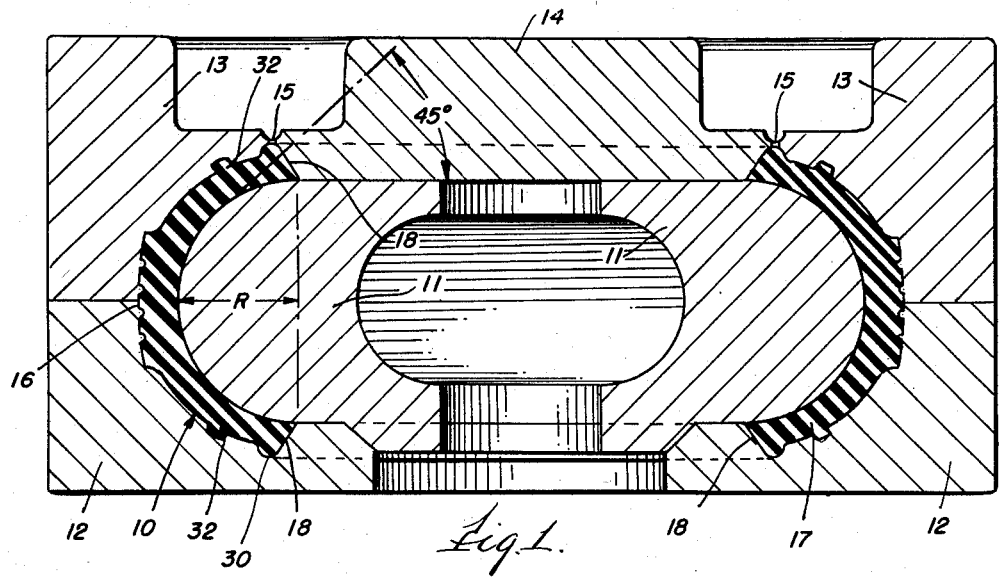
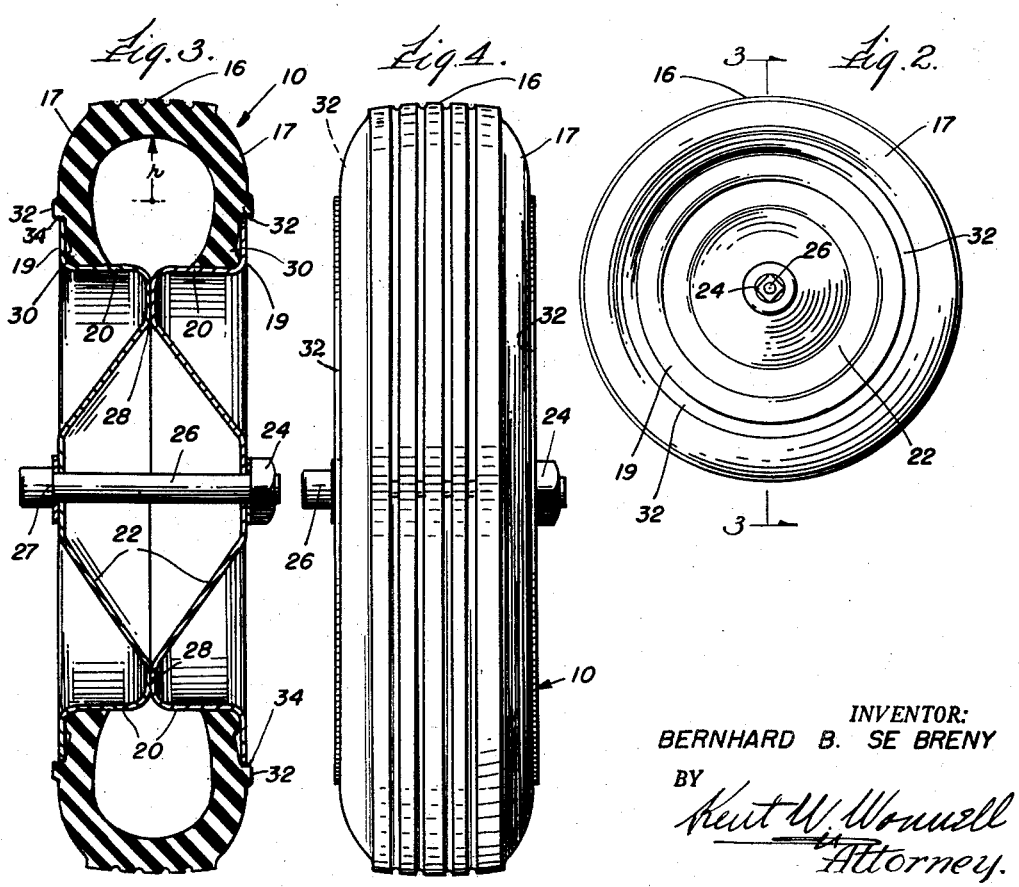
INVENTOR:
BERNHARD B. SE BRENY

United States Patent Office 2,909,208
Patented Oct. 20, 1959

2,909,208

TUBELESS AIR WHEEL

Bernhard B. SeBreny, Hinsdale, Ill.

Application February 13, 1956, Serial No. 565,058

5 Claims. (Cl. 152—327)

This invention relates in general to a vehicle wheel and is more particularly described as a semi-pneumatic tire having a casing which will resist compression more than it will resist stretch. The tire is held on the rim by resistance of the side walls against the outer vertical sides of the rim as well as by its resistance to stretch around the circumferential part of the rim.

When applied to a supporting rim, the tire has an inner air space but is without an inner tube within the casing and does not depend upon inflation for holding it in place.

It has heretofore been the practice in vehicle wheels for smaller vehicles such as baby carriages, toy wagons, and the like, to employ a closed tube inflated or partially inflated and relying upon the air pressure within the tube for supporting the casing and to cushion the vehicle.

By making the cross sectional body of the present tire on a radius approximately twice as large as it is to be after it is collapsed over a wheel rim, advantage is taken of all the stretch in the rubber so that it is possible to strip the tire in taking it off from a solid mandrel over which it is molded. This tire therefore provides a casing supported for radial and inward thrust from the rims, adapting a casing and a wheel made therefrom for a large variety of vehicles such as toys, scooters, baby carriages, and the like.

An important object of the invention is to provide a tire and wheel mounting which comprises a casing having an inner radius approximately twice as large when made as it is after applied to the rim to take advantage of all the stretch in the tire material and also with relatively thick side walls to resist compression more than it resists stretch.

A further object of the invention is to provide a tire casing having an inside radius approximately twice as large as the radius of the tire after it is applied to a wheel so that it may be stripped more readily from a solid mandrel upon which it is molded.

A still further object of the invention is to produce a semi-pneumatic tire with side walls approximately at an angle of 45° from the outer or main horizontal tread in the manufacture of the casing and with an outer bead at about an angle of 45° from the side wall so that the bead will hug a rim closely when the side walls are compressed to a 90° angle from the tread.

A further object of the invention is to make a tire casing of the form and construction set forth so it can be produced in a mass production basis at a fraction of the cost of the present semi-pneumatic tires.

A still further object of the invention is to provide a semi-pneumatic casing which is easily assembled upon a wheel having opposite rims and compressed between the rims so that the opposite sides are substantially parallel and compressed at about right angles from the tread when resting flatly upon the angled ends which gives the tire a compressive resistance which is adequate for the class of vehicles to which it is applied.

Other objects of the invention will appear in the specification and will be apparent from the accompanying drawings in which, Fig. 1 is a sectional view of an air wheel casing in accordance with this invention as cast within separable mold parts in forming the casing.

Fig. 2 is a side elevation of the casing in the form of a wheel.

Fig. 3 is a sectional view as taken on the line 3—3 of Fig. 2; and

Fig. 4 is a front elevational view of the wheel at right angles to that shown in Fig. 2.

By making this casing with the sides extending angularly and on a radius greater than the radius of the tire when it is in collapsed or usable form, advantage is taken of the stretch in the rubber so that the tire may be stripped from the solid mandrel on which it is produced and over which it is molded, and no further action is necessary to prepare the casing for application to a wheel, except to compress extended side walls inwardly between parallel rims so that the casing will have sufficient resistance to a flexing movement due to the weight of a vehicle and its contents to which the casing and tire is applied.

Referring now more particularly to the drawings, a casing 10 of rubber or other suitable plastic material is formed on a circular mandrel 11 with outer removable mold parts 12 and 13 and a cap plate 14 which provides top pouring openings 15 for casting the tire. The tire casing has an outer substantially flat tread 16 and outwardly flaring sides 17 which extend substantially at an angle of 45° from the tread with an inner radius R of curvature which is substantially twice the radius r of curvature when the casing is used as a tire as shown in Fig. 3.

At the projecting edge of each side wall, it is provided with an angular surface 18 which extends at an angle of approximately 45° to the tread 16 so that when these side walls are compressed between opposite rims 19, the angular surfaces 18 will be substantially parallel with the tread 16 and will fit flush against a supporting base wall 20 of the tire rim which extends circularly below the edges of the casing in its assembled position.

A complete wheel may be represented by two dished side plates 22 which terminate in the supporting wall structures 20 and the outer rims 19 between which the side walls of the casing are inserted and compressed in any suitable manner such as clamping the plates together by a nut 24 threaded on a shaft 26 against an inner shoulder 27 of the shaft, or by spot-welding the plates together at their line of contact 28 or both of these expedients if desired.

The outer surface of each side wall near the angular surfaces 18 are commonly provided with a slight bead 30 which causes the adjacent projecting portion of the outer sides 17 to curve slightly inward within the rims 18, or stated oppositely, the outer surface of the side walls rounds slightly outward from the rims 19 but these portions are substantially at right angles to the outer tread 16 when the casing is mounted upon the rims of a wheel to form a tire.

The outer surface of the casing is formed with a rib 32 on each outer side thereof at a short distance from the bead 30 which provides a distinct shoulder 34 for engaging the outer edges of the rims 19 when the casing is applied thereto to form a wheel. The rib 32 merges smoothly with the outer surface of the tire opposite the shoulder so that it projects slightly beyond the rim thus protecting the rim and being substantially flush with the outer rounded edge of the tire as shown in Fig. 3. When a weight is applied to the tire and the wheel sufficient to compress it slightly, the outer edges of the casing will be supported by the engagement of the shoulder 34 with the outer edges of the rim, thereby adding stability and increasing the resilient load carrying capacity of the wheel.

With this extended construction, the casing is made and is easily stripped from a separable production mandrel 11 and can be produced on a mass production basis at approximately 40% of the cost of the present semi-pneumatic tires which are extruded in tubular form, cut to size and the ends cemented together to form a pressure retaining tire. The present casing when applied to a rim to form a tire compresses the sides and stretches them adjacent the tread so that the tire is held on the rim by the resistance of the side walls against the inner vertical sides of the rim as well as by its resistance to stretch around the peripheral portion of the rim. For heavier weights, the tire may be supported by the engagement of its side shoulder with the edges of the rims. The tire has sufficient resilience and resistance to compression to maintain the weights and loads for which it is intended without unduly depressing the casing or collapsing each inwardly.

A wheel of this kind is light and strong; the casing is made more economically and is readily applied to opposite fixed rims of a wheel, and no provision is necessary for inflation or for an inner tube within the casing. This wheel is resilient, compressible and yielding under load, and the casing is more economical than a tube or than a casing which requires an inner tube or other means within the casing for supporting it.

While this preferred construction has been described in some detail, it should be regarded as an illustration or example rather than as a limitation or restriction of the invention, since various changes in the construction, combination, and arrangement of the parts may be made without departing from the spirit and scope of the invention.

I claim:

1. A resilient hollow uninflated semi-pneumatic tire formed on a mandrel and comprising a casing having, when mounted, an outer flat tread and integral side walls, the inside surface of which is semi-circular in cross section, the ends of said side walls forming bead portions the end surfaces of which flare at angles of 45° respectively with the tread, the radius of curvature of the inside of the casing, when the sides are pressed inwardly to mount the tire on a rim, being less than when the casing is formed on the mandrel.

2. A resilient hollow uninflated semi-pneumatic tire in accordance with claim 1, in which the ends of the side walls are beveled outwardly so that the side walls of the casing when pressed inwardly until the beveled ends are in the same transverse straight line, will form a self-supporting tire in which the radius of curvature of the inside is substantially one-half of the radius when the casing is formed on the mandrel.

3. A resilient hollow uninflated semi-pneumatic tire adapted to be formed on a mandrel and comprising a casing having, when mounted, an outer substantially flat tread and relatively integral thick side walls, the inside surface of the casing being substantially semi-circular in cross section when formed, in combination with a wheel having spaced peripheral rims extending radially and a supporting substantially flat surface between the rims, the ends of the side walls being beveled outwardly and the side walls of the casing pressed inwardly to engage the inside of the rims when the beveled ends of the side walls engage the flat tread between them and the resiliency of radially inner extremities of the side walls when pressing against the inner sides of the rims being sufficient to form a self-supporting tire in which the radius of curvature of the inside is substantially less than when a casing is formed.

4. A resilient tire in accordance with claim 3, in which the inside of the casing when it is supported within the rims with the outer sides of the side wall substantially at right angles to the outer tread has an outer circular portion approximately one-half of the diameter of the casing when it was formed.

5. A resilient semi-pneumatic tire in accordance with claim 4 in which the side walls are of substantial thickness to provide load bearing supports and the outer portions of the side walls each having a projection at a short distance from the extremity of the side wall which provides distinct shoulders for engaging the outer edges of the wheel rims when the tire is applied thereto to form a wheel.

References Cited in the file of this patent

UNITED STATES PATENTS

| | | |
|---|---|---|
| 1,380,496 | Osborn et al. | June 7, 1921 |
| 2,650,633 | Eger | Sept. 1, 1953 |

FOREIGN PATENTS

| | | |
|---|---|---|
| 1,646 | Great Britain | of 1911 |